E. KADDATZ.
NUT LOCK.
APPLICATION FILED APR. 2, 1919.
1,329,609.
Patented Feb. 3, 1920.
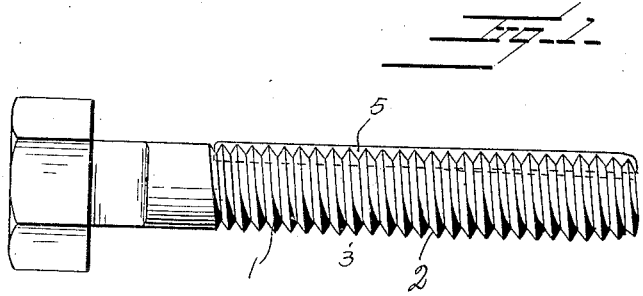
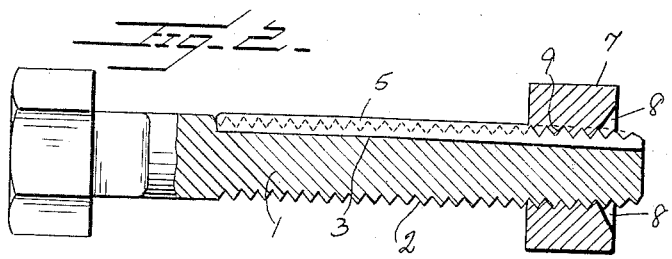
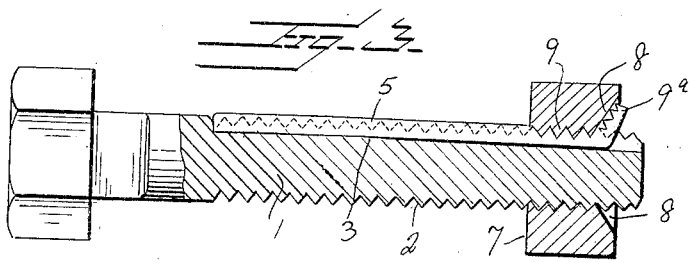
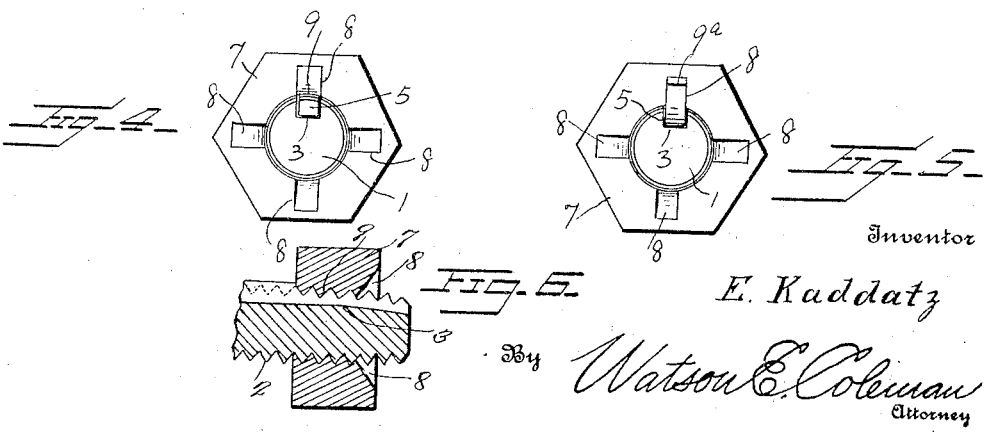
Inventor
E. Kaddatz
By Watson E. Coleman
Attorney

UNITED STATES PATENT OFFICE.

EMIL KADDATZ, OF ORTONVILLE, MINNESOTA.

NUT-LOCK.

1,329,609.   Specification of Letters Patent.   Patented Feb. 3, 1920.

Application filed April 2, 1919. Serial No. 286,951.

*To all whom it may concern:*

Be it known that I, EMIL KADDATZ, a citizen of the United States, residing at Ortonville, in the county of Bigstone and State of Minnesota, have invented certain new and useful Improvements in Nut-Locks, of which the following is a specification, reference being had to the accompanying drawings.

This invention relates to an improved nut lock and an object of the invention is to provide a simple, efficient and practical means for locking a nut on a bolt.

A further object of the invention is to provide an improved nut locking means, including an elongated groove formed longitudinally in the shank of a bolt and a key arranged in said groove, one end of the key being anchored at one end of the groove, said key being constructed of any suitable soft metal, whereby a nut, when being threaded upon the bolt may cut its own threads into the key, there being radial recesses formed in one face of the nut contiguous with the threaded opening of the nut, any one of which being adapted to receive the laterally outer extremity of the key, thereby preventing the nut from turning off of the shank of the bolt.

A further object of the invention is to provide a nut in which grooves (heretofore employed in the wall of the threaded opening of the nut) are eliminated, there only being notches or recessses in one face of the nut extending radially, whereby any one of which may receive a lateral end of a key, which is seated in the groove of the bolt.

A further object of the invention is the provision of a key especially constructed of galvanized wire, of comparatively soft metal, whereby the nut may cut threads into the key.

A further object of the invention is to provide means whereby the nut may be locked on the bolt firmly in any position relative to the bolt shank.

A further object of the invention is to provide a device of this kind in which the locking key for the nut is placed in the groove of the shank of the bolt prior to applying the nut, enabling the nut when screwed home to cut threads into the shank of the key to insure locking the nut in place.

In the present device, it is to be hereinafter obvious that the nut may be easily and quickly tightened, and may be easily and quickly released, by restoring the upturned end of the key to its normal position, and in this way, the removal of the key, to remove the nut is avoided.

It is to be understood that in the use of this invention, the various parts may be protected against moisture (which would tend to rust the various parts) by applying a coat of paint or the like. It is clear that a coat of paint on the various parts will not interfere with applying or the removal of the nut on the shank of the bolt.

The invention further aims to provide a nut locking device of this general character, which may be used in connection with bolts of various constructions, preferably on bolts used in connection with rails and rail joints or fish plates.

The invention further aims to provide a locking key, of comparatively soft metal, for the locking of the nut, it being the aim that when applying the nut, cutting threads into the key, the depth of the threads will not be deep enough to weaken the key, which would have a tendency to cause the key to become broken, when it is bent to lock the nut. This prevention of cutting the threads too deep is facilitated, by constructing the groove in the shank of the bolt reasonably deep and correspondingly constructing the key to seat its full depth into the groove. In other words, the bottom of the groove in the bolt shank should be considerably deeper than the depth of the threads of the shank of the bolt. This excessive depth of the groove in the shank of the bolt is considerably pronounced at the end of the shank of the bolt, and owing to this particular construction, the nut may be more easily and readily applied to the bolt, so as to allow the nut to start cutting its threads as it is being screwed home, consequently allowing the nut to be more readily applied.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a bolt, showing in dotted lines the length and depth of the key receiving groove, and the key arranged in the groove, the unattached end of the key being normally disposed, and the key also being shown without the threads.

Fig. 2 is a longitudinal sectional view through the bolt, showing the nut to be locked thereon, in position on the shank of the bolt, the unattached end of the key being still in normal position.

Fig. 3 is a view similar to Fig. 2, showing the unattached end of the key upset and engaging one of the notches in one face of the nut, threads having been cut into the key by the thread of the bore or opening of the nut.

Fig. 4 is an end view of Fig. 2.

Fig. 5 is an end view of Fig. 3.

Fig. 6 is a detail sectional view of a modified form of nut lock in which a very short portion of the bottom of the groove in the shank of the bolt is inclined.

Referring more especially to the drawings 1 designates the shank of a bolt, which is provided with the usual threads 2. The shank of the bolt is provided with an elongated groove 3 formed longitudinally, and the outer end of the groove has its bottom inclined downwardly. This inclination is gradual, as will be obvious on an inspection of the drawing. A locking key constructed of any suitable material, preferably galvanized soft metal, is arranged in the groove of the shank of the bolt. This key 5 has its inner end straight, and its outer end (when normally disposed) terminating even with the end of the shank of the bolt. Owing to the outer end portion of the bottom of the groove being inclined, as hereinbefore stated, the outer end of the key may be depressed, so as to facilitate the starting of the nut 7 on the shank of the bolt. Also, it is to be observed that the extremity of the shank of the bolt is slightly tapered. This tapering in practice should be hardly perceptible to the naked eye, but in the accompanying drawings this tapering is more or less pronounced, and assists materially in facilitating the starting of the nut on to the shank of the bolt. The outer face of the nut, contiguous with the threaded bore or opening thereof is provided with a plurality of notches 8, which are positioned radially. Any number of notches may be formed on the nut, it depending upon the requirements incident to the manufacture of the article. When screwing the nut home upon the shank of the bolt, it is obvious that, since the key is constructed of soft galvanized metal, the threads of the bore or opening of the nut will cut threads 9 into the key. Since the inclination of the bottom of the groove of the shank gradually diminishes in a direction toward the head of the bolt, the key is consequently inclined, owing to it being depressed in conformity to the inclination of the bottom of the groove, as the nut is being screwed home. It is also obvious that the further the nut is screwed toward home, the greater the leverage required to turn the nut, owing to the gradual increasing friction between the key and the cutting threads of the nut. In other words, when starting the nut on to the shank of the bolt, the cutting threads of the nut will cut shallow into the key, but as the nut approaches home, these threads in the key become gradually tapered, and owing to the threads gradually deepening, necessarily the increased friction, will assist in maintaining the nut firmly on the shank of the bolt. In order to assure the nut against turning or becoming accidentally moved out of its position, the outer extremity of the key is upset, forming a lug 9ª, which may engage any one of the notches of the outer face of the nut. While broadly speaking, the groove, the key and the nut have been heretofore devised, nevertheless the prior devices do not include the specific features of construction as heretofore named, and of such characters as to facilitate the secure locking of the nut on a shank of the bolt.

It is obvious that the outer surface of the key, when the key is depressed in conformity to the inclination of the bottom of the groove, is offset slightly in a position toward the center of the shank, in which case the outer face of the key is out of flush with the extreme outer marginal edges of the threads of the shank. However, this outer flush condition inwardly toward the center of the shank, owing to the inclination of the bottom of the groove, gradually increases until the rear part of the outer surface of the key is beyond the outer marginal edges of the inner part of the threads of the shank. Also it is to be noted that the bottom of the groove is considerably deeper than the bottoms of the spaces between the threads of the shank, in other words deeper than the threads, so as to lessen the possibilities of weakening the key, owing to cutting the threads therein as the nut is screwed home. Furthermore, owing to the provision of the inclination, the threads that are cut into the key gradually increases in depth from the outer extremity of the key toward the inner anchored end of the key.

It is obvious that the bolt may be threaded only a short distance from the end, say for instance, a third of its length, or half of its length, or may be threaded almost its full length, and furthermore, the keyway or groove may be any desirable depth, as may be thought advisable when constructing the device for commercial purposes. Also it is obvious that the inclination of the bottom of the groove may vary in degree. For instance just a small portion of the front end of the bottom of the groove may be inclined as shown in Fig. 6, and also the end of the key may be bent downwardly as indicated in Fig. 6. It is also to be noted that either a threaded or non-threaded key may be used. There can be as many notches 8 employed as found necessary for commercial purposes, and also the bottoms of these notches may be any suitable degree of inclination. It is obvious that the threads in the key may be cut any desired depth as may be found necessary or found sufficient to cut the threads of the nut which in the present instance cuts its own threads. Where the nut does not cut its own threads, the threads of the key may be any suitable depth to cut the threads of the nut.

The invention having been set forth, what is claimed as new and useful is:

The combination with the shank of a bolt having an elongated groove formed longitudinally thereof, the bottom of the groove for a portion of its length being inclined slightly in a direction toward the extremity of the shank, of a soft metallic elongated key engaging said groove, a nut threaded on the shank, the end portion of the shank being tapered, and the key adapted to be bent to conform to the inclined portion of the bottom of the groove, so that the outer edge of the key may conform to the taper of the shank, thereby facilitating the threading of the nut on to the shank and permitting the nut to cut its own threads into the key, one face of the nut having radial recesses, the other extremity of the key being bent to engage any one of the radial recesses, thereby preventing the nut from turning, the inner end of the key being non-anchored to the shank.

In testimony whereof I hereunto affix my signature in the presence of two witnesses.

EMIL KADDATZ.

Witnesses:
GRACE F. KAERCHER,
L. A. KAERCHER.